United States Patent [19]

Block

[11] Patent Number: 4,515,037
[45] Date of Patent: May 7, 1985

[54] HANDLE ASSEMBLY

[75] Inventor: Dale A. Block, Sheboygan, Wis.

[73] Assignee: Kohler Co., Kohler, Wis.

[21] Appl. No.: 481,576

[22] Filed: Apr. 1, 1983

[51] Int. Cl.³ .............................................. G05G 1/10
[52] U.S. Cl. ...................................... 74/553; 74/548; 403/258; 403/348
[58] Field of Search .................... 74/548, 553; 16/118, 16/121; 292/347; 403/3, 258, 348

[56] References Cited

U.S. PATENT DOCUMENTS

| 1,524,764 | 2/1925 | Underwood | 74/553 |
| 1,690,801 | 11/1928 | Van Bree | |
| 2,117,759 | 5/1938 | Douglass | 403/348 |
| 2,726,570 | 12/1955 | Thorburn | |
| 2,759,754 | 8/1956 | Kaiser | 292/347 |
| 3,572,162 | 3/1971 | Gresham et al. | |
| 4,065,216 | 12/1977 | Nelson | |
| 4,306,468 | 12/1981 | Bolgert | |
| 4,385,577 | 5/1983 | Graham | 403/348 |

FOREIGN PATENT DOCUMENTS

| 251985 | 10/1963 | Australia | 403/258 |
| 272593 | 6/1965 | Australia | 403/258 |
| 15880 | of 1888 | United Kingdom | 403/348 |
| 1561972 | 3/1980 | United Kingdom | 16/121 |
| 1599531 | 10/1981 | United Kingdom | 16/121 |

Primary Examiner—Gary L. Smith
Assistant Examiner—Michael F. Trettel
Attorney, Agent, or Firm—Quarles & Brady

[57] ABSTRACT

A concealed mounting arrangement for attaching a handle to a rotatable stem without the need for using an exposed attachment screw is disclosed. In one embodiment, there is an adapter element fixedly mountable on the stem, and a handle element mountable on the adapter with a fit that allows relative rotational and axial movement therebetween. One of these elements is provided with a connecting pin that extends towards the other element and has an enlarged head near its outer end. The other of these elements is provided with a mounting slot comprising an access opening that faces said one element and receives the head therethrough when the elements are moved axially toward one another, an intermediate portion leading from the access opening in a direction of relative rotation between the elements and the intermediate portion has a shoulder engageable with the underside of the head during such rotation to prevent the elements from moving axially apart. An outwardly facing pocket portion is formed adjacent the far end of the intermediate portion. It can receive the head when the head is aligned therewith after the elements have been moved axially apart. The engagement of the head and the pocket then serve to prevent relative rotation of the elements. A spring acts to hold the head in the pocket.

3 Claims, 9 Drawing Figures

HANDLE ASSEMBLY

BACKGROUND OF THE INVENTION

A. Field of the Invention

The present invention relates to decorative handles which are attachable to rotatable stems. It is especially useful in allowing a decorative handle to be attached to a rotatable valve control stem without requiring the use of an exposed access hole or an exposed screw hole.

B. Description Of The Art

Valve control stems are often provided with a fluted attachment end that is formed with an axial screw hole. Conventional handles that are designed for use with such stems usually have a fluted interior bore which mates with and slides over the fluted end. An attachment screw then passes through the handle and into the stem screw hole to secure the handle to the stem. In order to make the screw accessible, so that the handle may be readily installed and removed, an access hole is normally formed in the top of the handle.

To protect the interior of the handle and to improve appearance, attempts were made to hide the access hole and the screw. To this end, the prior art developed special snaps or covers which could be placed over the access hole and removed when appropriate. Side set screws which passed through the handle neck instead of the handle top were another alternative. However, the use of the special snaps or covers detracted from the decorative appearance of the top of the handle and added extra cost to the assembly. Side set screws detracted from the appearance of the neck of the handle and were awkward.

More recently, U.S. Pat. No. 4,306,468, which issued on Dec. 22, 1981 to E. F. Bolgert, disclosed an improved decorative handle assembly which relied upon a sandwiching of an assembly ring and a handle insert around a stem adapter (the stem adapter being screwed onto the stem). While this handle assembly did have advantages over the prior art, it was desired to reduce the cost of manufacture and installation still further.

SUMMARY OF THE INVENTION

The invention resides in a concealed mounting arrangement for attaching a handle to a rotatable stem. In one aspect of the invention, there is provided an adapter element fixedly mountable on the stem, and a handle element mountable on the adapter with a fit that allows relative rotational and axial movement therebetween. One of the elements is provided with a connecting pin that extends towards the other element and has an enlarged head near its outer end. The other element is provided with a mounting slot that has an access opening that faces said one element and receives a head therethrough when the elements are moved axially towards each other, and an intermediate portion leading from the access opening in a direction of relative rotation between the elements. The intermediate portion includes a shoulder engageable with the underside of the head during such rotation to prevent the elements from moving axially apart.

The slot also has an outwardly facing pocket portion adjacent the far end of the intermediate portion that can receive the head when it is aligned therewith. The engagement of the head and the pocket serves to prevent relative rotation of the elements.

There is also provided a spring member between the elements that is compressible to allow the elements to be moved axially towards each other. This allows the head to enter the access opening and to be rotated into alignment with the pocket. The spring member is also expandable so as to cause the head to be moved into and held in the pocket.

In another aspect of the invention, there is an adapter fixedly mountable on the stem. The adapter has a radial flange provided with a circumferential mounting slot that extends between a surface of the flange that faces towards a stem free end direction, and another surface of the flange that faces in the opposite direction. The slot comprises an enlarged access portion, a narrowed intermediate portion, and an enlarged pocket adjacent the opposite end of the intermediate portion. The pocket opens away from the stem free end direction.

A handle is removably mounted on the adapter and has a mounting pin that extends towards the flange. The pin is provided near its outer end with an enlarged head. The head is received through the access portion when the handle is mounted on the adapter, the handle then being relatively rotatable with respect to the adapter to a position where the head is aligned with the pocket. Relative axial separation of the handle and the adapter then moves the head into the pocket to prevent further rotation of the handle and adapter. An axially compressible spring is also provided between the handle and the adapter to bias the head towards the pocket.

In an especially preferred form of the invention, the pocket comprises an inner bore and an outer bore. The outer bore is of a larger diameter than the inner bore, and the two bores are sized such that the head can move into the outer bore but not through the inner bore. This allows the mounting pin to protrude through the flange so as to connect with the handle while not allowing the head of the pin to pass through the flange when the head is in the pocket.

In another especially preferred form, there are a plurality of slots in the flange, and a corresponding plurality of pins extending from the handle. Also, a fluted central bore is formed in the adapter which is suitable to receive and mesh with a fluted free end of the stem.

Accordingly, the objects of the invention include:

(a) providing a handle assembly of the above kind in which the handle may be attached to a stem without requiring the use of a screw hole or other attachment mechanism passing through the handle exterior;

(b) providing a handle assembly of the above kind in which the handle may be readily removed for inspection, cleaning and repair;

(c) providing a handle assembly of the above kind in which the handle and a skirt depending from the adapter cover the internal elements of the assembly; and (d) providing a concealed mounting arrangement of the above kind, which is inexpensive to manufacture, comprised of few parts, easy to install, and which is made of structurally secure elements.

These and still other objects and advantages of the invention will be apparent from the description which follows. In the detailed description which follows, the preferred embodiment of the invention will be described with reference to the accompanying drawings. This embodiment does not represent the full scope of the invention. Rather, the invention may be employed in other embodiments. Reference is therefore to be made to the claims herein for interpreting the breadth of the invention.

DESCRIPTION OF THE PREFERRED EMBODIMENT

Figure 1:
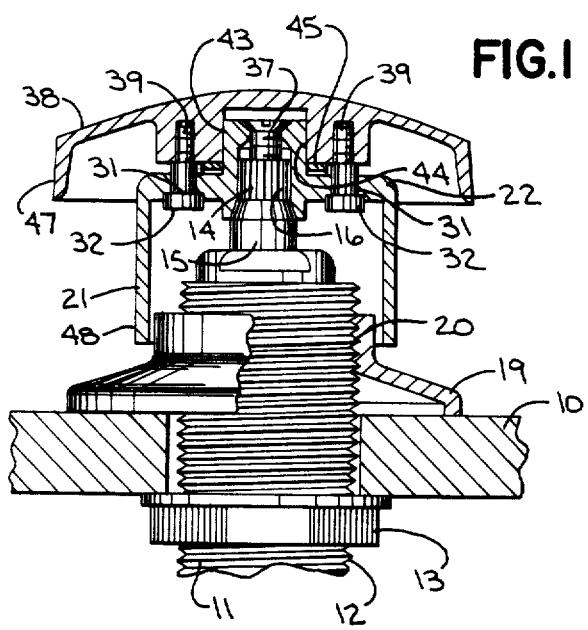
FIG. 1 is a partially sectioned view of a handle assembly embodying the invention which is attached to a valve stem.
Figure 3:
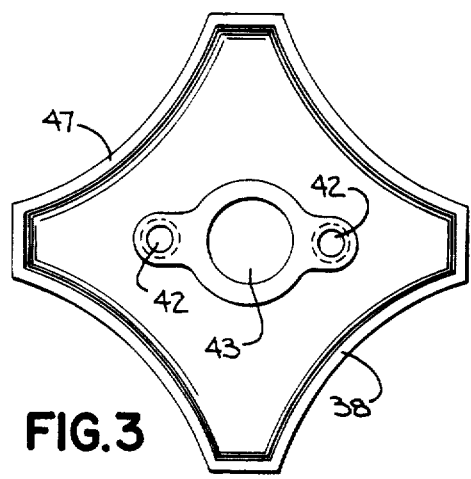
FIG. 3 is a bottom plan view of the handle shown in FIG. 1.
Figure 4:
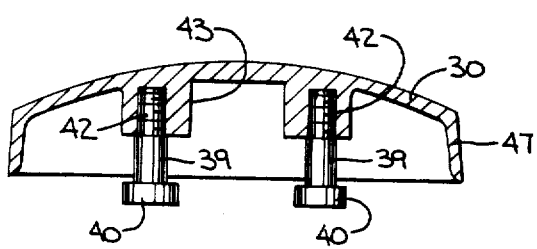
FIG. 4 is a sectional view of the handle shown in FIG. 1, with screws shown mounted therein.
Figure 2:
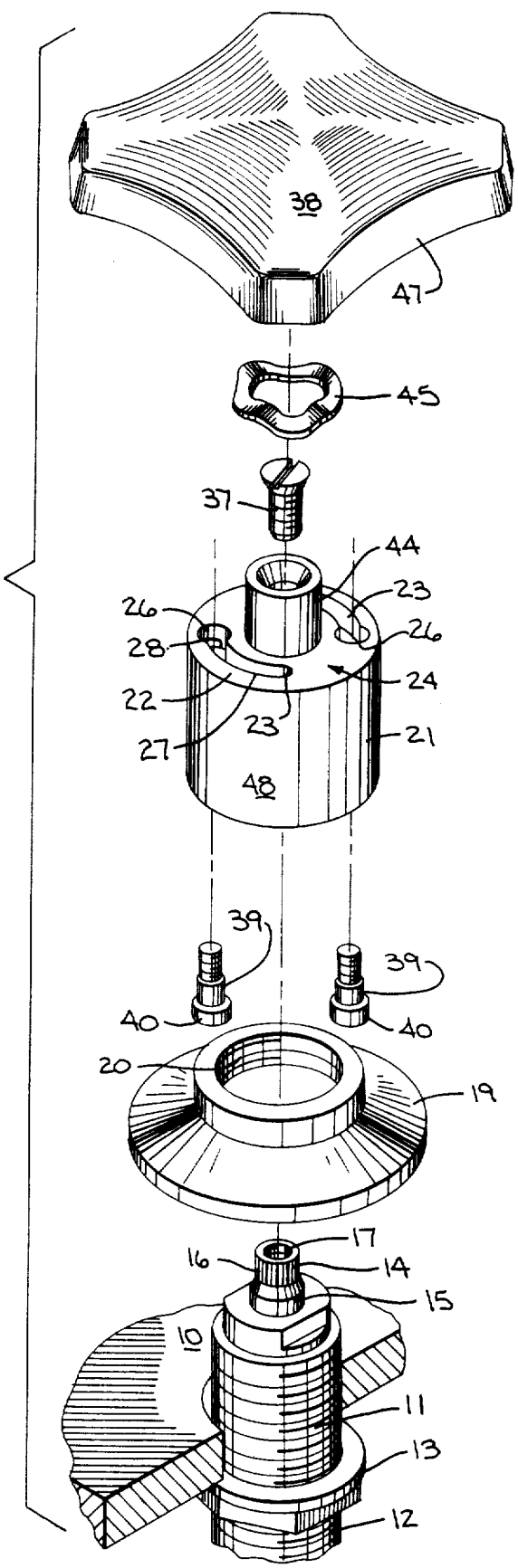
FIG. 2 is an exploded perspective view of the parts shown in FIG. 1.

Referring now to FIGS. 1 and 2, there is shown a lavatory top 10 through which a valve 11 protrudes. (Only the upper part of the valve 11 is shown.) Threads 12 on the valve 11 carry a threaded attachment nut 13. Nut 13 holds the fixture against upward movement relative to the lavatory top 10. A conventional form of valve stem 14 protrudes upwardly from the housing neck 15. It is fluted at its free end 16. A threaded axial screw hole 17 is provided in the top of the stem 14, and an escutcheon 19 having inner threads 20 is screwed down upon the valve 11 to sandwich the lavatory top 10. The general arrangement of these parts is a common form of construction.

Figure 6:
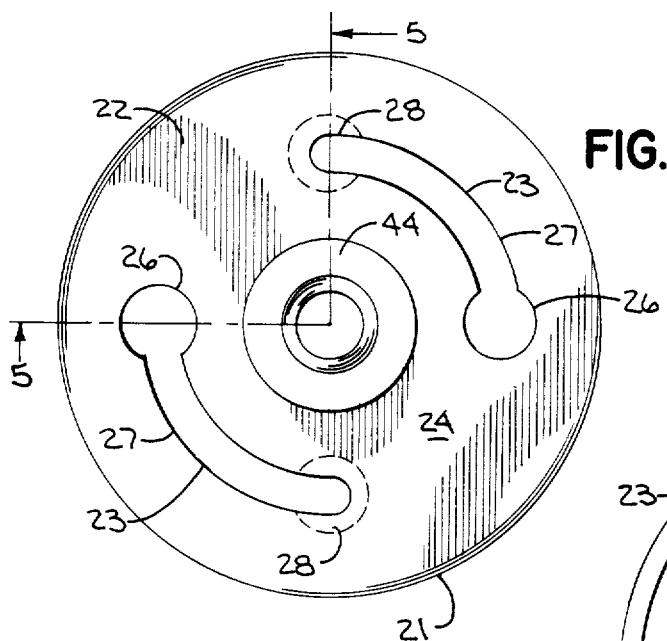
FIG. 6 is a top plan view of the adapter shown in FIG. 5.
Figure 7:
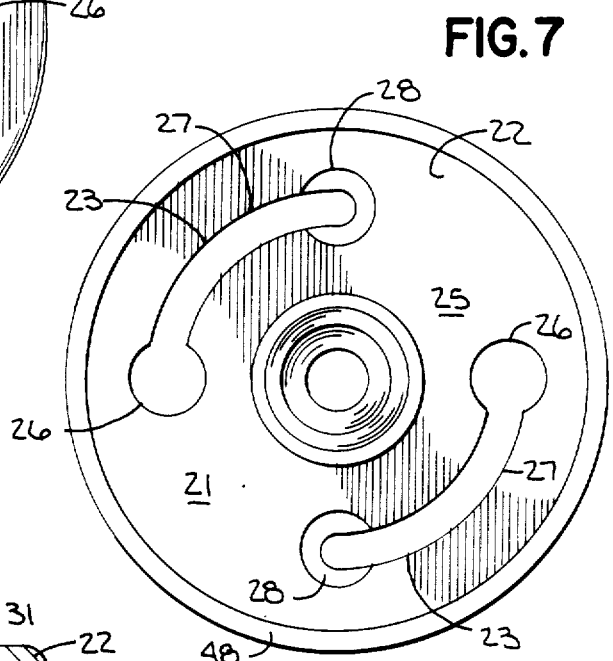
FIG. 7 is a bottom plan view of the adapter shown in FIG. 5.
Figure 5:
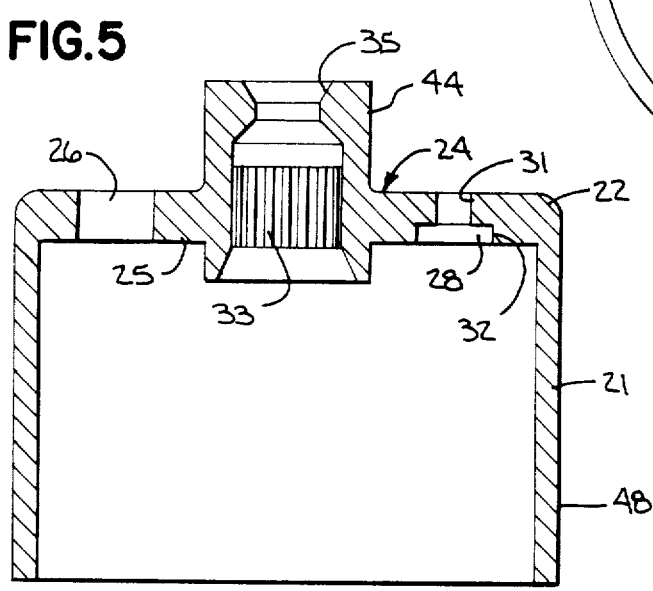
FIG. 5 is a sectional view of the adapter shown in FIG. 1 which is taken along line 5—5 in FIG. 6.

In accordance with the present invention, there is provided an adapter 21. As best seen in FIGS. 5-7, the adapter 21 has a radial flange 22 which is provided with a pair of kidney shaped circumferential mounting slots 23. Mounting slots 23 extend between a surface 24 of the flange 22 that faces in the stem free end direction (upward) and another surface 25 of the flange 22 that faces in the opposite direction (downward).

Each slot 23 comprises an enlarged access portion 26, a narrowed intermediate portion 27, and an enlarged pocket 28 adjacent the opposite end of the intermediate portion 27. The pocket 28 opens away from the stem free end direction when the adapter 21 is mounted on the stem 14.

As best seen in FIG. 5, the enlarged access portion 26 is preferably of a uniform diameter all the way through the flange 22. In contrast, the pocket 28 comprises an inner or upper bore 31, and an outer or lower bore 32. The outer bore 32 is of a larger diameter than the inner bore 31.

Further with respect to the adapter 21, there is a fluted central bore 33 which is suitable to receive and mesh with the fluted free end 16 of the stem 14. Also, a screw hole 35 is provided in the top of the adapter 21. The adapter 21 is mountable on the stem 14 by use of a screw 37 which passes through the screw hole 35 and into the stem hole 17. The adapter 21 and stem 14 will then rotate as a unit, and will be axially fixed relative to each other.

Handle 38 is removably mountable on the adapter 21. It has two mounting pins or screws 39 which extend towards the flange 22, and which are provided near their outer end with an enlarged head 40. Where screws are used (as in FIG. 1), they can easily be assembled into threaded holes 42 formed in the bottom of the handle by simply turning the screws 39 into the screw holes 42. Instead of screws, rivets and rivet bores can also be used. Other similar configurations (e.g. hooks) may also prove suitable.

It will be appreciated that bore 43 in the bottom of the handle 38 is sized so as to slideably fit over adapter hub 44. This allows relative axial and rotational movement between the handle 38 and the adapter 21 when the handle is mounted on the adapter 21.

Heads 40 of the pins 39 are received through the access portions 26 of the adapter 21. Then, the handle 38 can be rotated with respect to the adapter 21 to a position in which the heads 40 are aligned under the flange with the pockets 28. Relative axial separation of the handle 38 and the adapter 21 will then cause the heads 40 to move upwards into the pockets 28, thereby preventing further rotation of the handle 38 with respect to the adapter 21.

Figure 8:
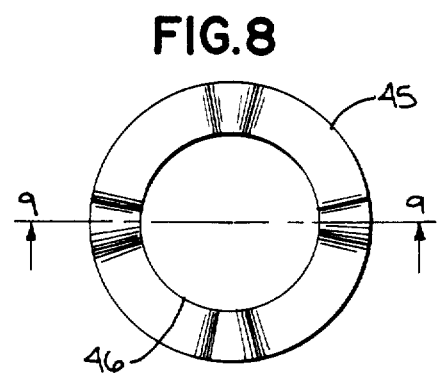
FIG. 8 is a top plan view of the washer spring shown in FIG. 1.
Figure 9:
FIG. 9 is a sectional view which is taken along line 9—9 in FIG. 8.

An axially compressible washer spring 45 is also provided (see FIGS. 8-9). It is circular with a central bore 46 of a size that fits around the adapter hub 37. The spring 45 fits between the handle 38 and the adapter 21 so as to provide an upward force on the handle 38. This biases the heads 40 into the pockets 28.

It will be appreciated that the assembled handle functions in a manner comparable to conventional faucet handles. Rotation of the handle 38 will cause the adapter 21 and thus the valve stem 14 to turn. This allows the valve to be turned on and off. However, simple rotation in either direction will not lead to the handle becoming disassembled from the adapter or stem.

This result is achieved without the need for externally exposed access or screw holes in the handle. In this regard, it should be noted that skirts 47 and 48, which are formed on the handle and adapter, hide and protect the internal components of the assembled handle.

Because screws, rivets and washer springs are so readily available and inexpensive, because threaded bores can easily be formed in metal handles, and because the adapter 21 can easily be fabricated from metal using conventional casting and boring techniques, the handle assembly is very inexpensive to produce.

Moreover, the costs of installing the valve are very small. To mount the handle 38 on stem 14, one simply inserts the screws 37 through the adapter 21 and into the stem 14, places the washer spring 45 over the adapter 21, inserts heads 40 into the access openings 26, and then rotates the handle 38 until the heads 40 are under the pockets 28. If one then releases the handle 38, the handle 38 will automatically snap into a locked position. In order to remove the handle 38, one need only push firmly down on the handle 38, and rotate the heads 40 into alignment with the access openings 26.

Thus, the invention provides an improved means for attaching a decorative handle to a stem. The assembly is comprised of few parts, is solid in construction, is inexpensive to manufacture and install, and prevents contaminants from entering the internal handle parts.

While a preferred embodiment of the invention has been described above, it should be apparent to those skilled in the art that a number of modifications and changes may be made to this embodiment without departing from the spirit and scope of the invention. For example, instead of having the pins extend from the handle into slots on the adapter, these parts can be reversed, and the pins can extend from the adapter towards corresponding internal slots in the handle bottom. Another possibility is that instead of the adapter flange being formed so that the pins pass all the way through the flange, the pins can pass only part way through the flange into an undercut recess, or the pins might hook around the outside of a flange rim. Therefore, it is intended that the scope of the invention should be judged by the claims which follow.

I claim:

1. In a concealed mounting arrangement for attaching a valve handle to a rotatable valve control stem so that the handle is capable of rotating in both a clockwise and a counter-clockwise direction to control flow volume, the combination comprising:

an adapter element fixedly mountable on the stem;

a handle element mountable on the adapter with a fit that allows relative rotational and axial movement therebetween;

one of said elements being provided with a connecting pin that extends towards the other element and has an enlarged head near its outer end;

the other of said elements being provided with a mounting slot comprising an access opening that faces said one element and receives the head therethrough when the elements are moved axially toward each other, an intermediate portion leading from the access opening in a direction of a relative rotation between the elements, and that includes a shoulder engageable with the inward side of the head during such rotation to prevent the elements from moving axially apart, and an outwardly facing pocket portion adjacent the far end of the intermediate portion that can receive the head when it is aligned therewith, said head and pocket then being constructed and arranged so that a portion of the head abuts laterally against the pocket to prevent relative rotation of the elements; and a spring member between said elements that is compressible to allow the elements to be moved axially towards each other to allow the head to enter the access opening and to be rotated into alignment with the pocket, and that is expandable to cause the head to be moved into and held in the pocket.

2. In a concealed mounting arrangement for attaching a handle to a rotatable stem, the combination comprising;

an adapter element fixedly mountable on the stem;

a handle element mountable on the adapter with a fit that allows relative rotational and axial movement therebetween;

one of said elements being provided with a connecting pin that extends towards the other element and has an enlarged head near its outer end;

the other of said elements being provided with a mounting slot comprising an access opening that faces said one element and receives the head therethrough when the elements are moved axially toward each other, an intermediate portion leading from the access opening in a direction of relative rotation between the elements, and that includes a shoulder engageable with the inward side of the head during such rotation to prevent the elements from moving axially apart, and an outwardly facing pocket portion adjacent the far end of the intermediate portion that can receive the head when it is aligned therewith, the engagement of the head in the pocket then serving to prevent relative rotation of the elements due to a stepped interfitting between the outer periphery of the head and the pocket; and a spring member between said elements that is compressible to allow the elements to be moved axially towards each other to allow the head to enter the access opening and to be rotated into alignment with the pocket, and that is expandable to cause the head to be moved into and held in the pocket.

3. In a concealed mounting arrangement for attaching a handle to a rotatable stem, the combination comprising:

an adapter element fixedly mountable on the stem;

a handle element mountable on the adapter with a fit that allows relative rotational and axial movement therebetween;

one of said elements being provided with a connecting pin that extends towards the other element and has an enlarged head near its outer end;

the other of said elements being provided with a mounting slot comprising an access opening that faces said one element and receives the head therethrough when the elements are moved axially toward each other, an intermediate portion leading from the access opening in a direction of relative rotation between the elements, and that includes a shoulder engageable with the inward side of the head during such rotation to prevent the elements from moving axially apart, and an outwardly facing pocket portion adjacent the far end of the intermediate portion that can receive the head when it is aligned therewith, the engagement of the head in the pocket then serving to prevent relative rotation of the elements;

the pocket having an inner portion and an outer portion, the outer portion being of a larger diameter than the inner portion, and the two portions being sized such that the head of the pin can move into the outer portion but not through the inner portion; and a spring member between said elements that is compressible to allow the elements to be moved axially towards each other to allow the head to enter the access opening and to be rotated into alignment with the pocket, and that is expandable to cause the head to be moved into and held in the pocket.

* * * * *